United States Patent Office 3,231,617
Patented Jan. 25, 1966

3,231,617
PROCESS FOR MERCAPTOALKYLATING AMINES
John C. James, Melrose, Mass., assignor to Monsanto Research Corporation, St. Louis, Mo., a corporation of Delaware
No Drawing. Filed Feb. 28, 1962, Ser. No. 176,408
6 Claims. (Cl. 260—583)

This invention relates to ethylene sulfide, and more particularly, provides a novel method of reacting ethylene sulfide with an amine.

It is known that ethylene sulfide can be reacted with an amine to form the 1:1 addition product, which is an N-mercaptoalkyl amine. Conditions reported for forming this product include maintaining ethylene sulfide in contact with the amine in a sealed tube at about 100° C. with or without benzene solvent, heating a mixture consisting of the amine and the ethylene sulfide at reflux, and maintaining the ethylene sulfide in contact with the amine in benzene solution at room temperature. Investigators employing such methods have noted that the formation of the desired 1:1 addition product is accompanied by substantial yields of by-products, even with simple amines, where the sole radical attached to the amine group is hydrocarbon such as cyclohexyl, n-butyl or the like. Where the amine is primary, both of the hydrogen atoms attached to nitrogen may each be replaced by a mercaptoethyl group, to produce bis(mercaptoethyl)amines. Both primary and secondary amines give a by-product produced by addition of two moles of ethylene sulfide to one of amine, which is the product of serial addition of the sulfide, to form a polymeric chain of repeating units such as an N-mercaptoalkylthioalkyl amine. Under conditions producing reasonable yields of the 1:1 addition product, substantial losses of amine occur due to formation of this 2:1 or higher polymer. Moreover, given a chain starter, ethylene sulfide can polymerize to give high molecular weight products consisting of ethylene sulfide units.

It has been found that addition of ethylene sulfide in benzene solution to a stirred solution of an amine in benzene maintained at 50° C. or to a refluxing solution of the amine in benzene, at about 80–100° C., is a convenient method which works reasonably well to give 1:1 addition products of ethylene sulfide with hydrocarbyl amines.

When the radical attached to the amine group is not hydrocarbon, however, but carries substituents such as a hydroxy group, the solubility of the amine in a hydrocarbon solvent such as benzene tends to decrease, and polymer formation by the ethylene sulfide, to increase. With strongly polar amines which are substantially insoluble in benzene, polymer formation becomes so predominant that yields of the desired 1:1 addition product become vanishingly small. Using a solvent in which the amine is soluble, such as diglyme (the dimethyl ether of diethylene glycol), does not solve the problem. As in the benzene system, the result is almost exclusively a polymeric product.

It is an object of this invention to provide a novel method of reacting ethylene sulfide with an amine.

A particular object of this invention is to provide a novel method of reacting ethylene sulfide with a polar amine to provide the 1:1 addition product thereof wherein by-product formation is minimized.

These and other objects will become evident from a consideration of the following specification and claims.

It has now been found that by contacting ethylene sulfide with a solution of an amine insoluble in a non-polar solvent, in a mixture of said non-polar solvent and a polar solvent, the 1:1 addition product of said amine and ethylene sulfide is produced in satisfactory yields.

The mixed solvent technique of this invention is unexpectedly effective in diminishing by-product formation. Indeed, polymer formation becomes negligible while at the same time the desired reaction whereby the 1:1 addition product is formed proceeds smoothly and rapidly.

The amines to which the method of this invention may be applied with particular advantage are polar amines which are substantially insoluble in a non-polar solvent. Non-polar solvents include hydrocarbons such as benzene or like, aromatic hydrocarbons such as toluene, diethyl benzene and the like; aliphatic hydrocarbons such as hexane, petroleum fractions and the like; and so forth. By substantially insoluble is meant a solubility of less than 1 to 2 grams per 100 milliliters.

Illustrative of amines having this characteristic of low solubility in a non-polar solvent are highly polar amines such as 2-aminoethanol, 1,3-diamino-2-propanol, 2-amino-2-methyl-1,3-propanediol and so forth. Indeed, if desired the presently provided method may be applied to more soluble amines such as 1,3-propanediamine or the like, although the full benefits of this invention are achieved only where the amine is sufficiently polar and consequently insoluble in non-polar solvents that polymer formation by the ethylene sulfide in such solvents is disturbingly great, so that it requires the presently provided surprisingly effective method of inhibiting such polymerization to achieve satisfactory yields of the 1:1 addition product. Generally these are amines with a ratio approaching one functional group per carbon atom. However, this does not always hold true. For example, while octa- and decamethylenediamine are benzene-soluble, the intermediate diamine, 1,9-nonanediamine, unexpectedly is not. It is, however, amenable to mercaptoethylation by the present method.

The alkylene sulfides to which this invention may be applied include ethylene sulfide and also other alkylene sulfides comprising an aliphatic hydrocarbon chain free of aliphatic unsaturation and including a three-membered ring formed by a sulfur bridge between two adjacent carbon atoms. Thus for example, 1,2-propylene sulfide, 1,2-butylene sulfide, 2,3-butylene sulfide, cyclohexane sulfide, 2-methyl-1,2-propylene sulfide and the like may be employed. Ethylene sulfide is particularly preferred, and the discussion herein accordingly refers to this specific sulfide hereafter, as illustrative of the invention.

In accordance with this invention, the selected amine will be dissolved in a mixed solvent system comprising a non-polar solvent and a polar solvent, and in this connection, what is meant by non-polar solvent is a non-polar solvent as defined above, in which the amine is substantially insoluble, such as benzene. By a polar solvent is meant a solvent having a substantial dipole moment, and in particular, one having a dipole moment at least as high as about that of ethanol. The polar solvent, moreover, must be selected to have a substantial solvency power for the selected amine. A variety of alcohols may be employed in this connection, provided they have sufficient solvency power for the amine, and in this connection alcohols such as ethanol, isopropanol, tert-butanol, ethylene glycol and the like are particularly favorable. Other useful solvents include for example the dimethyl ether of ethylene glycol, the dimethyl ether of diethylene glycol and the monomethyl ether of diethylene glycol and the like; dimethylformamide, dimethylsulfoxide, and so forth.

The solvent mixture employed for the practice of this invention will comprise a major proportion of non-polar solvent and a minor proportion of the selected polar solvent having a good solvency power for the amine which is to be reacted with the alkylene sulfide. A minimum amount of polar solvent should be employed, just sufficient to produce a solubility of the amine in the solvent mixture from about 5 grams to about 20 grams per 100 milliliters.

In conducting the method of the invention, the ethylene sulfide will gradually be introduced into a solution of the amine in the solvent mixture. Desirably, the ethylene sulfide will be freshly prepared. The solution of the amine is preferably at a temperature of between about 50° and about 150° C., and most preferably at reflux temperature. It is desirable to maintain the system as completely anhydrous as possible. Atmospheric pressures are suitable for conducting the method of this invention, although if desired the pressure may vary to some extent from this. The addition of the ethylene sulfide will be continued until not more than one mole of ethylene sulfide has been added per equivalent of amine (wherein an equivalent is one mole of the amine divided by the number of amine groups the aimne contains which it is desired to mercaptoethylate). Preferably, less ethylene sulfide is employed and indeed, the ratio of amine to ethylene sulfide is desirably between 5 to 1 and 10 to 1 (molar ratio) when addition of the ethylene sulfide is complete. After completion of the introduction of the ethylene sulfide, heating at temperatures as used during its introduction may be continued for a time. The rate of introduction of the ethylene sulfide should be sufficiently slow to prevent appearance of any noticeable exotherm of the reaction mixture, and the time for which heating is continued after its introduction is complete may be about ⅓ to ¼ that required for the introduction of the sulfide.

Upon completion of the reaction, the 1:1 addition product may be recovered simply by taking off solvent, as for example, by heating under vacuum, and distilling off the desired product.

The invention is illustrated but not limited by the following examples.

Example 1

A 10% by volume solution of ethanol in benzene is prepared by combining 320 milliliters (ml.) of ethanol with 2880 ml. of benzene. This mixture is dried azeotropically by refluxing. Then 560 grams (g.) of 2-aminoethanol is added to the solvent mixture, and refluxing to dry the reaction mixture is continued. When the system has been substantially freed of water, introduction of ethylene sulfide is initiated, by dropwise addition of a solution of 55 g. ethylene sulfide in 100 ml. benzene, over a period of between 3 and 4 hours. Refluxing is continued for a further hour, and then the reaction mixture is stripped of solvent by heating under vacuum. The clear, oily residue is distilled, and the fraction boiling at 66–72° C. column head temperature at 0.15–0.25 millimeter (mm.) is recovered. This is 2-[(2-mercaptoethyl)amino]ethanol, $n_D^{20}$ 1.5379, $d_4^{20}$ 1.139 (supercooled), M. 55–60° C. The yield, calculated with reference to ethylene sulfide introduced, considering only the substantially pure product isolated by the stated distillation, without attempt to recover additional product present in the reaction mixure, is 40% of theoretical.

Proceeding similarly, 2-amino-2-ethyl-1,3-propanediol is converted to 2-[(2-mercaptoethyl)amino]-2-ethyl-1,3-propanediol.

Example 2

A mixture of ethanol and benzene in a 10:90 volume ratio is dried by refluxing as described in the previous example, and then 77.4 g. of 1,3-diamino-2-propanol is added to 1200 ml. of the refluxed mixture of solvents and refluxing is continued to dry the reaction mixture. Then a solution of 18 g. of ethylene sulfide in 100 ml. benzene is gradually added to the refluxing mixture, over a period of 5 hours. Refluxing is continued for an additional hour after all the ethylene sulfide has been added, and then the solvent is removed on a rotary evaporator. The resulting oil is distilled. After removal of a forerun with a refractive index of about 1.50, a cut is distilled over at a bath temperature of 155–165° C., column head temperature 96–92° C./0.06 mm. A residue remains in the flask which solidifies on cooling. The 1-[(2-mercaptoethyl)amino]-3-amino-2-propanol in the cut isolated by distillation is converted to the dihydrochloride by mixing with water under a blanket of nitrogen, and stirring while the mixture is acidified with about 4 N hydrochloric acid to a final pH of about 2. The water is evaporated off and the viscous residue dried to give the dihydrochloride as a straw colored viscous oil which subsequently solidifies.

Example 3

A mixture of 350 ml. of benzene and 30 ml. of absolute ethanol is found to dissolve 100 g. of 1,9-nonanediamine at reflux temperature. A solution of 7.6 grams of ethylene sulfide and 100 ml. of benzene is added dropwise, over a period of 2 hours, to the refluxing solution of the diamine. After the addition is complete, refluxing is continued for another 2 hours. Then solvent is removed and the product distilled. N-(2-mercaptoethyl)-1,9-nonanediamine is obtained by the distillation as an oil, B. 120–130° C./0.3 mm., which solidifies on cooling. The dihydrochloride salt is prepared by treating the free amine with hydrochloric acid in aqueous medium: it is found to have an analysis corresponding closely to the calculated.

While the invention has been illustrated with reference to various particular preferred embodiments thereof, it will be appreciated that modifications and variations can be made within the scope of the appended claims.

What is claimed is:

1. The method of mercaptoalkylating an amine which comprises dissolving an amine selected from the class consisting of amino alcohols and diamines which is substantially insoluble in a non-polar hydrocarbon solvent, in a mixture of said non-polar hydrocarbon solvent and a polar solvent having a dipole moment at least as high as about that of ethanol and in which said amine is soluble, including a major proportion of said non-polar solvent and a minor proportion of said polar solvent, just sufficient to produce a solubility of said amine compound in the solvent mixture of from about 5 grams to about 20 grams per 100 milliliters, and introducing an alkylene sulfide into the resulting solution at a temperature of between about 50° and about 150° C., said alkylene sulfide consisting of an aliphatic hydrocarbon chain free of aliphatic unsaturation and a sulfur bridge between two adjacent carbon atoms forming a three-membered ring, thereby producing the 1:1 addition product of said amine with said alkylene sulfide.

2. The method of claim 1 wherein said alkylene sulfide is ethylene sulfide.

3. The method of mercaptoalkylating 2-aminoethanol which comprises dissolving 2-aminoethanol in a mixture of a non-polar hydrocarbon solvent in which it is substantially insoluble and a polar solvent having a dipole moment at least as high as about that of ethanol, and in which said amine is soluble, including a major proportion of said non-polar solvent and a minor proportion of said polar solvent, just sufficient to produce a solubility of said amine compound in the solvent mixture of from about 5 grams to about 20 grams per 100 milliliters, and introducing an alkylene sulfide into the resulting solution at a temperature of between about 50° and about 150° C., said alkylene sulfide consisting of an aliphatic hydrocarbon chain free of aliphatic unsaturation and a sulfur bridge between two adjacent carbon atoms forming a 3-membered ring, thereby producing the 1:1 addition product of said amine with said alkylene sulfide.

4. The method of mercaptoalkylating an amine which comprises dissolving 2-aminoethanol in a mixture of a major proportion of benzene and a minor proportion of ethanol, just sufficient to produce a solubility of said amine compound in the solvent mixture of from about 5 grams to about 20 grams per 100 milliliters, and introducing ethylene sulfide into the resulting solution at a temperature of from about 50° to about 150° C., thereby producing the 1:1 addition product of said 2-aminoethanol with said ethylene sulfide.

5. The method of mercaptoalkylating an amine which comprises dissolving 1,3-diamino-2-propanol in a mixture of a major proportion of benzene and a minor proportion of ethanol, just sufficient to produce a solubility of said amine compound in the solvent mixture of from about 5 grams to about 20 grams per 100 milliliters, and introducing ethylene sulfide into the resulting solution at a temperature of from about 50° to about 150° C., thereby producing the 1:1 addition product of said 1,3-diamino-2-propanol with said ethylene sulfide.

6. The method of mercaptoalkylating an amine which comprises dissolving 1,9-nonanediamine in a mixture of a major proportion of benzene and a minor proportion of ethanol, just sufficient to produce a solubility of said amine compound in the solvent mixture of from about 5 grams to about 20 grams per 100 milliliters, and introducing ethylene sulfide into the resulting solution at a temperature of from about 50° to about 150° C., thereby producing the 1:1 addition product of said 1,9-nonanediamine with said ethylene sulfide.

References Cited by the Examiner
UNITED STATES PATENTS

| | | | |
|---|---|---|---|
| 2,105,845 | 1/1938 | Reppe et al. | 260—583 XR |
| 2,282,710 | 5/1942 | Dietrich | 260—583 XR |
| 2,998,451 | 8/1961 | Boenig | 260—584 XR |

OTHER REFERENCES

Conant: "The Chemistry of Organic Compounds," revised edition (1939), The McMillan Company, New York, p. 155.

Degering et al.: "An Outline of Organic Nitrogen Compounds," University Lithoprinters, Ypsilanti, Mich. (1945) p. 199.

Webster's Third New International Dictionary (1961), G. and C. Merriam Company, Springfield, Mass., p. 70.

CHARLES B. PARKER, *Primary Examiner.*